United States Patent [19]

Sugita et al.

[11] Patent Number: 4,477,488
[45] Date of Patent: Oct. 16, 1984

[54] METHOD OF MANUFACTURING MAGNETIC RECORDING MEDIUM

[75] Inventors: Ryuji Sugita, Hirakata; Kenji Kanai, Neyagawa; Seishi Sasaki, Nishinomiya; Ken Takahashi, Suita, all of Japan

[73] Assignee: Matsushita Electric Industrial Co., Ltd., Kadoma, Japan

[21] Appl. No.: 473,766

[22] Filed: Mar. 10, 1983

[30] Foreign Application Priority Data

Mar. 16, 1982 [JP] Japan .................. 57-42043
Dec. 27, 1982 [JP] Japan ................. 57-231543

[51] Int. Cl.³ .............................................. B05D 5/12
[52] U.S. Cl. .................................... 427/129; 427/130; 427/131; 427/132; 427/251; 427/255.7
[58] Field of Search ................................. 427/127–132, 427/48, 251, 255.7

[56] References Cited

U.S. PATENT DOCUMENTS 3,342,633  9/1967  Bate et al. ............................ 117/217
4,226,681 10/1980  Shirahata et al. .................. 427/131

Primary Examiner—Bernard D. Pianalto
Attorney, Agent, or Firm—Cushman, Darby & Cushman

[57] ABSTRACT

In making magnetic recording media by vapor-depositing magnetic metal film containing Co-Cr with 70-90 weight % Co as host material on a high polymer substrate, with or without intermediate layer(s) inbetween, making the high polymer substrate run around a cylindrical can, condition is selected such that linear expansion coefficient of the substrate is $1.0 \times 10^{-5}$–$2.9 \times 10^{-5}$/°C. and temperature of the can surface is 150°–300° C.; thereby normal or inverse curling of the resultant recording medium is substantially eliminated.

4 Claims, 7 Drawing Figures

FIG. 1
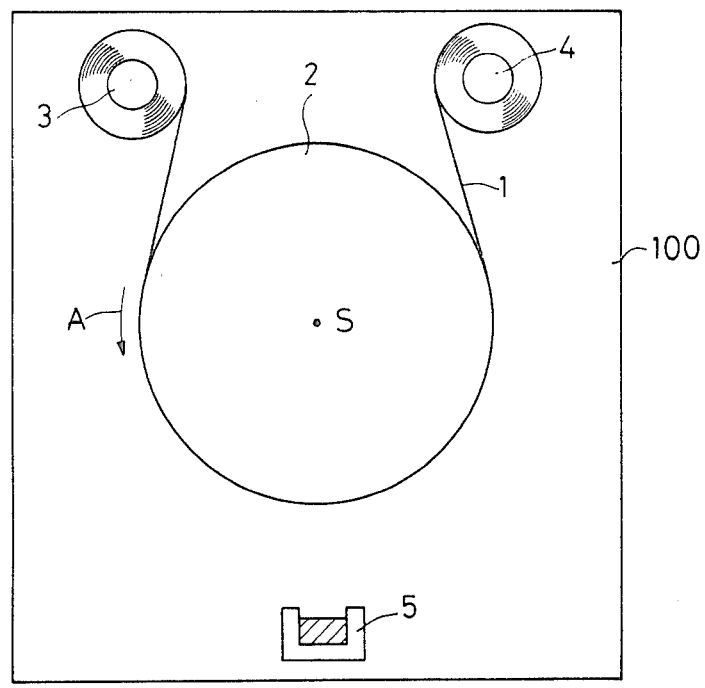
FIG. 2(a)　　FIG. 2(b)
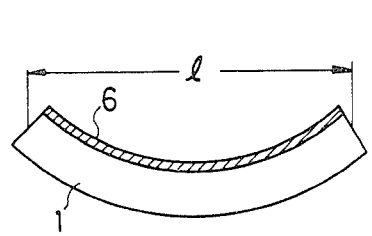 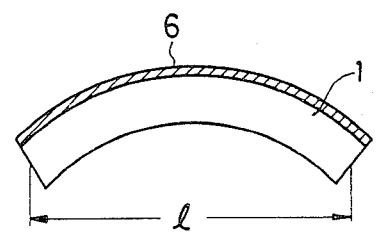

METHOD OF MANUFACTURING MAGNETIC RECORDING MEDIUM

BACKGROUND OF THE INVENTION

1. Technical Field

The present invention relates to a method of manufacturing magnetic recording medium having superior recording characteristic for short wavelength recording.

2. Prior Art

Hitherto for magnetic recording medium, coating type medium wherein magnetic powder coating are applied on a non-magnetic substrate sheet or film has been widely used. Recently the magnetic recording and playing apparatus become miniaturized and are highly integrated as general trend, and the above-mentioned coating type recording media has technical limit in fulfilling needs for such high density recording. In order to overcome such limit, recording media of ferromagnetic metal thin-film has been increasingly considered. The present invention relates to an improvement in such ferromagnetic thin film recording media.

Among the thin film materials, those having Co as the host material is most superior since it has large crystal aniisotropy energy based on hexagonal close packed structure. Especially a Co-Cr film containing 10–30 weight percent Cr can be a superior vertical magnetization film (the film is hereinafter referred to Co-Cr vertical magnetization film). A Co-Cr film containing 10–30 weight percent Cr is superior also in corrosion-resistivity. That is, a magnetic recording medium having Co-Cr film containing 10–30 weight percent Cr has actual utility, and also superior in short wavelength recording characteristic, hence can be said as ideal thin film medium. Various methods exist for coating the ferromagnetic metal thin-film on the recording medium, including plating method, sputtering method, vacuum deposition method, or the like. The vacuum deposition method is most superior method for mass production. In order to form a thin film type recording medium by means of the vapour deposition method while maintaining good and stable manufacturing productivity, usually the vapour deposition is made on a substrate 1 consisting of a high polymer material being driven along a cylindrical can or cylindrical body 2 from a vaporizing source 5 in an evacuated chamber 100. The cylindrical can is driven to rotate around a shaft S by a known means. The high polymer substrate 1 is fed out from one roll 3 and wound up by another roll 4, as shown in FIG. 1.

However when the thin film is formed in the above-mentioned way, in general the recording medium is likely to curl as shown in FIG. 2(a) and in FIG. 2(b). That is, the recording medium curls concavely with respect to the ferromagnetic metal thin film 6 or convexly, depending on the natures and conditions of material and manufacturing processes. Accordingly the recording medium is likely to have insufficient contact with a magnetic head used for writing or reading information onto or from the medium, and hence poor characteristics in running or winding up. The state of curling shown in FIG. 2(a) is called normal curl and the state of curling shown in FIG. 2(b) is called inverse curl. Providing the width of the recording medium when it is flatly extended is $l_0$, and is curled to become the width of l as shown in FIG. 2, then a ratio of curling R defined by $$(l_0 - l)/l_0 = R$$

should be 4% or lower in order to be usable as magnetic recording medium. In order to fulfil the above-mentioned condition, it is known to form a counter curl coating 7 as shown in FIG. 3 on the opposite face to the ferromagnetic thin metal coating 6, for instance using non-magnetic coating, or alternatively when the curling is of normal curling, a heat treatment may be carried out after forming the thin ferromagnetic film so as to shrink the substrate; but either method requires additional process leading to increased production costs.

SUMMARY OF THE INVENTION

The present invention provides a magnetic recording media comprising ferromagnetic coating containing Co and Cr as host material with or without an underlying layer inbetween on high polymer material substrate wherein curling caused by the coating is substantially prevented, thereby assuring good running, winding and head touching characteristics.

BRIEF DESCRIPTION OF THE DRAWING

FIG. 1 is a schematic front view of the vacuum deposition apparatus for use in manufacturing magnetic recording medium.

FIG. 2(a) and FIG. 2(b) are the sectional view of the recording medium respectively making normal curling and inverse curling.

DESCRIPTION OF THE PREFERRED EMBODIMENTS

The of the present invention can realize a curling ratio $(l_0 - l)/l_0$ of 4% or below by selection of optimum condition for the vapour deposition with respect to coefficient of linear expansion $\alpha$ of the substrate and temperature of outer surface of the cylindrical can or cylindrical guide body.

Table 1 shows values of the curling rate obtained by many experiments when a vapour deposition was made in the apparatus shown in FIG. 1 thereby forming ferromagnetic metal thin film of Co-Cr containing 20 weight percent Cr, on substrates of three different linear expansion coefficients $\alpha$ and using three can temperatures. The substrate was 15 μm thick and the Co-Cr film was 2000 Å thick.

TABLE 1

| T | $\alpha$ ($\times 10^{-5}/°C$.) | | |
|---|---|---|---|
| (°C.) | 0.5–0.9 | 1.0–2.9 | 3.0–3.5 |
| 0–140 | normal curl, higher than 4% | normal curl, higher than 4% | inverse curl, higher than 4% |
| 150–300 | normal curl, higher than 4% | curl is 4% or lower | inverse curl, higher than 4% |
| 310–350 | normal curl, | inverse curl, | inverse curl, |

TABLE 1-continued

| T | $\alpha$ ($\times 10^{-5}/°C.$) | | |
|---|---|---|---|
| | 0.5–0.9 | 1.0–2.9 | 3.0–3.5 |
| | higher than 4% | higher than 4% | higher than 4% |

From the value of the table 1 it is observed that when the linear expansion coefficient $\alpha$ is in a range of $1.0 \times 10^{-5}$–$2.9 \times 10^{-5}/°C$. and outer surface of the can is 150°–300° C., the curling ratio $(l_0-l)/l_0$ of the ferromagnetic recording medium becomes 4% or lower. Incidentally it is experimentally confirmed that the similar results are obtained even when the constituent of Cromium in the Co-Cr thin film is changed in a range of 10–30 weight percent, thickness of the substrate is changed to 9 $\mu$m, 12 $\mu$m, 20 $\mu$m or 26 $\mu$m, and the thickness of the ferromagnetic thin film is changed in a range of 500–5000 Å.

Furthermore, even when a thin film of Ti or permalloy is formed between the Co-Cr thin flm and the high polymer substrate, the same result as above was obtained.

From the above results, the curling ratio $(l_0-l)/l_0$ becoming 4% or lower is supposed that by heating the outside surface of the can to the temperature of 150°–300° C., the substrate is subject to thermal expansion and the Co-Cr film is formed in the thermally expanded substrate, and amount of shrinkages of the substrate and the Co-Cr film when they depart from the can surface, lowering their temperature, are substantially the same.

Figure 3:
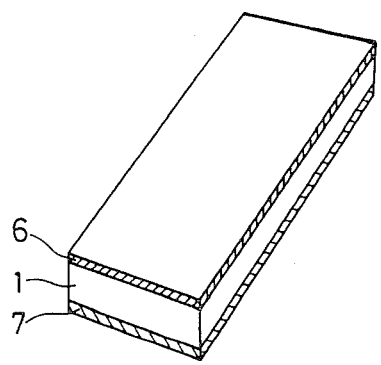
FIG. 3 is the perspective view of the recording medium with anti-curl coating on the opposite side to the ferromagnetic coating.
Figure 4A:
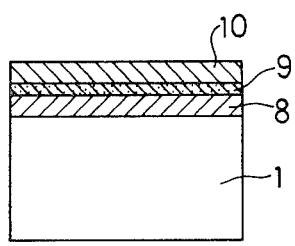
FIG. 4(a) is a sectional view of a recording media made in accordance with the present invention.
Figure 4B:
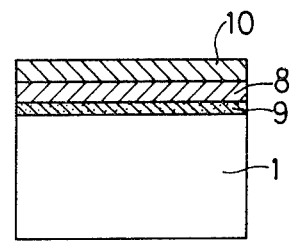
FIG. 4(b) is a sectional view of another recording medium made in accordance with the present invention.

In case a Co-Cr vertical magnetization film is formed on the substrate of high polymer material by means of the vapour deposition method, it is well known that characteristic of Co-Cr vertical magnetization film is improved by firstly vapour depositing a Ti film on the substrate and thereon the Co-Cr film is vapour deposited. Furthermore, it is known that by providing a permalloy film between the substrate and Co-Cr vertical magnetization film, recording efficiency and playback output are improved in comparison with the case without the permalloy film. The former type recording media with permalloy intermediate film are called double layered media, and the media without such permalloy film are called single layered media. As shown in FIG. 4(a) or in FIG. 4(b) by providing Ti film in the double layered media, recording-playback characteristic can be improved. FIG. 4(a) shows a construction that on a substrate 1 of high polymer material, a permalloy film 8 is formed, thereon Ti film 9 is formed and further thereon Co-Cr vertical magnetization film 10 is formed. FIG. 4(b) shows another example construction that on a substrate 1 of high polymer material, Ti film 9 is formed and further thereon a permalloy film 8 is formed, and further thereon a Co-Cr vertical magnetization film 10 is formed.

When a single layered medium or a modified double layered medium as shown in FIG. 4(a) and FIG. 4(b) are manufactured by vapour deposition method, it is experimentally confirmed that there is a necessity that in the first state where a first layer of Ti film or permalloy film is vapour deposited on the high polymer substrate, the curling ratio $(l_0-l)/l_0$ should be 6% or lower. If the curling ratio $(l_0-l)/l_0$ exceeds 6% at the state that the first film has been formed on the substrate, then when an overriding Co-Cr vertical magnetization is formed thereon by vapour deposition the curling becomes more, or if a thermal treatment would be applied thereon for decreasing or removing the curl then the vertical magnetization film makes crack thereby making the recording media unusable. On the other hand, when the curling ratio $(l_0-l)/l_0$ is controlled 6% or below, a medium having the Co-Cr vertical magnetization film formed thereon has very small curl, and substantially no cracks are made in the vertical magnetization film.

Table 2 shows experimental results of curling ratio when Ti film is firstly formed on the high polymer substrate for substrates of various linear expansion $\alpha$ coefficients and for various temperature T of the can of the vapour deposition apparatus. In the experiments the substrate thickness was 15 $\mu$m and Ti film thickness was 500 Å.

TABLE 2

| T | $\alpha$ ($\times 10^{-5}/°C.$) | | |
|---|---|---|---|
| (°C.) | 0.5–0.9 | 1.0–2.9 | 3.0–3.5 |
| −20–0 | normal curl, higher than 6% | normal curl, higher than 6% | inverse curl, higher than 6% |
| 10–120 | normal curl, higher than 6% | curl is 6% or lower | inverse curl, higher than 6% |
| 130–200 | normal curl, higher than 6% | inverse curl, higher than 6% | inverse curl, higher than 6% |

As shown in Table 2 when the linear expansion coefficient $\alpha$ of high polymer material of the substrate is in a range of $1.0 \times 10^{-5}$–$2.9 \times 10^{-5}/°C.$, and the surface temperature of the can is in a range of 10°–120° C., the recording media of the curling ratio of 6% or below is obtainable. Furthermore, even when the substrate thickness is changed in a range of 9–26 $\mu$m and Ti film thickness is changed in a range of 300–1500 Å, the same results as table 2 was obtained.

Table 3 shows experimental results of curling ratio $(l_0-l)/l_0$ when permalloy film is first formed on the substrate of high polymer material in the apparatus of FIG. 1. Therein the substrate thickness was 15 $\mu$m and permalloy film thickness was 1000 Å.

TABLE 3

| T | $\alpha$ ($\times 10^{-5}/°C.$) | | |
|---|---|---|---|
| (°C.) | 0.5–0.9 | 1.0–2.9 | 3.0–3.5 |
| 0–110 | normal curl, higher than 6% | normal curl, higher than 6% | inverse curl, higher than 6% |
| 120–260 | normal curl, higher than 6% | curl is 6% or lower | inverse curl, higher than 6% |
| 270–350 | normal curl, higher than 6% | inverse curl, higher than 6% | inverse curl, higher than 6% |

Table 3 shows that when $\alpha$ is in a range of $1.0 \times 10^{-5}$–$2.9 \times 10^{-5}/°C.$ and surface temperature of the can is in a range of 120°–260° C., the film of curling ratio $(l_0-l)/l_0$ of 6% or below is obtainable. Even when substrate thickness is changed in a range of 9–26 $\mu$m and permalloy film thickness is changed in a range of 500–3000 Å the same results as table 3 was obtainable.

By forming Ti film and permalloy film under the condition that curling ratio is 6% or below, even when the Ti film and permalloy film are superposedly formed, the curling ratio $(l_0-l)/l_0$ can be maintained 6% or below. Furthermore, when Co-Cr vertical magnetization film is formed on this double layered films keeping the surface temperature of the can in a range of 150°–300° C., single layered medium or double layered medium without cracks and having curling ratio of 4% or lower was obtainable.

EXAMPLE 1

Figure 5:
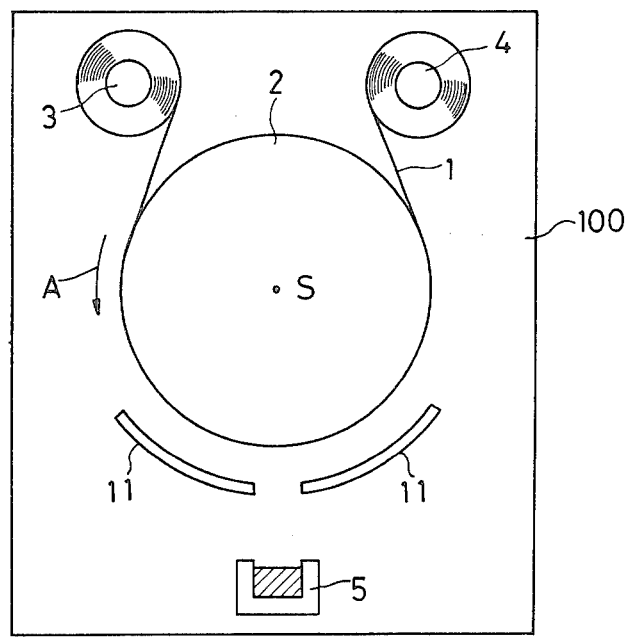
FIG. 5 is a schematic front view of a vapour deposition apparatus for carrying out a manufacturing method in accordance with the present invention.

By utilizing a vapour deposition apparatus as shown in FIG. 5, a vertical magnetizing film of Co-Cr containing 20 weight percent Cr, having axis of easy magnetization in a direction normal to the surface of ferromagnetic film, is vapour deposited on a high polymer film substrate. The apparatus has mask 11 for vapour deposition and other parts are substantially the same as the vapour deposition apparatus of FIG. 1. For the high polymer film substrate 1 a 12 $\mu$m thick film of heat resistive polyamide high polymer material is used, and the ferromagnetic film is formed by making the substrate 1 run at a running speed of 10 m/min during the vapour-deposition, and Co-Cr film of 2000 Å thickness is formed keeping the surface temperature of the can 2 at 230° C. The linear expansion coefficient $\alpha$ of this polyamide film was $1.6 \times 10^{-5}$/°C. The resultant vertical magnetization recording media has a slight normal curl, the curling ratio $(l_0-l)/l_0$ of which was 2%.

EXAMPLE 2

By utilizing the same vapour deposition apparatus of FIG. 5, 500 Å thick Ti film is formed on a heat resistive high polymer material film substrate of 10 $\mu$m film thickness. Then thereon, a Co-Cr vertical magnetization film of 1200 Å thickness is formed. The vapour deposition was made under the conditions that running speed of the substrate film was 10 m/min, surface temperature of the can at the vapour deposition was 80° C. and 250° C. for Ti film deposition and Co-Cr vertical magnetization film deposition, respectively. The linear expansion coefficient $\alpha$ of the substrate film was $2.4 \times 10^{-5}$/°C. The resultant vertical magnetization recording media has inverse curl and its curling ratio was 3%.

EXAMPLE 3

By usilizing the vapour deposition apparatus of FIG. 5, on a substrate of 12 $\mu$m thick heat resistant high polymer material, a 400 Å Ti film was formed by vapour deposition, and thereon 1000 Å thick permalloy film and further thereon 1000 Å Co-Cr vertical magnetization film are sequentially formed. The vapour deposition conditions were that the running speed of the substrate was 10 m/min, surface temperature of the can when vapour depositing the Ti film, permalloy film and Co-Cr vertical magnetization film were 40° C., 180° C. and 200° C., respectively. The linear expansion coefficient of the substrate film was $2.1 \times 10^{-5}$/°C. The resultant double layered film medium has a slight normal curl and the curling ratio is 1%.

As has been elucidated in detail, according to the method of the present invention, by selecting the linear expansion coefficient of the substrate to be in the range of $1.0 \times 10^{-5} - 2.9 \times 10^{-5}$/°C. and temperature of the outside face of the can to be in the range of 150°-300° C. during the vapour deposition process, a recording medium having substantially no curl is obtainable.

What is claimed is:

1. A method of manufacturing a magnetic recording medium including a high polymer substrate with a magnetic film deposited thereon, with or without intermediate layer(s) therebetween, the magnetic film containing Co-Cr as a host material, the constituent of Co being in a range of 70-90 weight %, comprising the steps of:
    selecting the polymer substrate to have a linear expansion coefficient in the range of $1.0 \times 10^{-5}$ to $2.9 \times 10^{-5}$/°C.;
    temperature controlling the outer surface of a cylindrical can to be within the range of 150°-300° C.; and
    running the polymer substrate around the temperature controlled can and vapor depositing the magnetic film thereon during the running.

2. A method of manufacturing a magnetic recording medium including a high polymer substrate with a vertical magnetization magnetic film deposited thereon, and having an intermediate layer therebetween of vapor deposited Ti film, the magnetic film containing Co-Cr as a host material, the constituent of Co being in a range of 70-90 weight %, comprising the steps of:
    (a) selecting the polymer substrate to have a linear expansion coefficient in the range of $1.0 \times 10^{-5}$ to $2.9 \times 10^{-5}$/°C.;
    (b) temperature controlling the outer surface of a cylindrical can to be within the range of 10°-120° C.;
    (c) running the polymer substrate around the can and vapor depositing the Ti film intermediate layer thereon;
    (d) temperature controlling the outer surface of a cylindrical can to be within the range of 150°-300° C.; and
    (e) running the polymer substrate around the temperature controlled can and vapor depositing the magnetic film over the intermediate layer during the running.

3. A method in accordance with claim 2, further comprising the steps of:
    prior to step (b), vapor depositing onto the substrate a permalloy film while running the substrate around said cylindrical can which is temperature controlled in a range of 120°-260° C.

4. A method in accordance with claim 2, further comprising a step of
    after step (c), vapor depositing a permalloy film onto said high polymer substrate while running it around said cylindrical can which is temperature controlled in a range of 120°-260° C.

* * * * *